United States Patent [19]

Hurst

[11] Patent Number: 5,053,140
[45] Date of Patent: Oct. 1, 1991

[54] PROCESS AND APPARATUS FOR REMOVING IMPURITIES FROM WATER USED IN FOOD PROCESSING UTILIZING A MIXTURE OF OZONE AND AIR

[75] Inventor: William D. Hurst, Wichita, Kans.

[73] Assignee: American Water Purification, Inc., Wichita, Kans.

[21] Appl. No.: 386,438

[22] Filed: Jul. 26, 1989

[51] Int. Cl.⁵ .......................... C02F 1/24; C02F 1/78; B03D 1/100
[52] U.S. Cl. .................................. 210/704; 210/712; 210/718; 210/760; 210/764; 210/188; 210/202; 210/221.2; 210/750; 426/312; 426/320; 426/417; 422/28; 422/293; 261/DIG. 42
[58] Field of Search ................... 210/188, 221.1, 221.2, 210/750, 758, 760, 703, 704, 712, 718, 202, 764; 426/312, 320, 417; 422/28, 32, 293; 261/DIG. 42

[56] References Cited

U.S. PATENT DOCUMENTS

| | | |
|---|---|---|
| 3,314,880 | 4/1967 | Rubin . |
| 3,350,301 | 10/1967 | Hoffman . |
| 3,732,163 | 5/1973 | Lapidot . |
| 3,945,918 | 3/1976 | Kirk . |
| 3,951,795 | 4/1976 | Doncer et al. . |
| 4,053,399 | 10/1977 | Donnelly et al. ................. 210/221.2 |
| 4,076,617 | 2/1978 | Bybel et al. . |
| 4,274,970 | 6/1981 | Beitzel . |
| 4,744,903 | 5/1988 | McAninch et al. . |
| 4,744,904 | 5/1988 | McAninch et al. . |
| 4,746,440 | 5/1988 | Seeger . |

OTHER PUBLICATIONS

Sheldon, B. W. & Brown, A. L. "Efficacy of Ozone as a Disinfectant for Poultry Carcasses & Chill Water", J. Food Science, vol. 51, No. 2, pp. 305–309, 1986.

Primary Examiner—Peter Hruskoci
Assistant Examiner—Robert James Popovics
Attorney, Agent, or Firm—Litman, McMahon & Brown

[57] ABSTRACT

An apparatus and a process for using the apparatus for removing fat, bacteria, solids and other impurities from water used in food processing so that substantially all the water may be reused includes a tower. The water is passed through a coarse filter to remove large pieces and is then introduced into the tower near the top thereof and flows out the tower near the bottom thereof. A mixture of ozone and air is introduced at the bottom of the tower and bubbled up through the tower, counter to the flow of the water. The ozone and water mixture carries impurities, especially the fat, over the top of the tower as a foam. The foam then flows over the tower into a waste drain. The process and apparatus may be varied to include a second tower unit with an alternative intermediate filter unit between the first tower and second tower unit. In this embodiment, large pieces are removed in the coarse filter, fat is mostly removed in the first tower, remaining solid particles are removed in the intermediate filter and additional impurities, including protein, are removed in the second tower unit by a counter-current air and ozone mixture. After the second tower unit, the water is passed through a polish filter, ozones removing device and a chlorinator.

28 Claims, 2 Drawing Sheets

PROCESS AND APPARATUS FOR REMOVING IMPURITIES FROM WATER USED IN FOOD PROCESSING UTILIZING A MIXTURE OF OZONE AND AIR

BACKGROUND OF THE INVENTION

This invention relates to the treatment of water, especially chilled water, previously used in a food processing environment so as to remove fat, protein, microorganisms and other impurities therefrom and to improve the light transmission properties of the water to allow a substantial amount of the water to be reused with only minimal additional cooling.

In the food processing industry, chilled water is used for the purpose of cooling the food product being processed, especially chicken carcasses and other meat products. Such cooling is usually by direct contact of the food product with the chilled water and, where the food product is not previously sealed in a container, a portion of the product becomes waterborne in an amount that, while small relative to the volume of water, contaminates the water and makes it cloudy or dark thereby making it unreusable for the same process. In some industries, substantial volumes of cooling water are required for each unit of food product processed. Traditionally, the water is obtained, cooled, used in the food process and discharged. This discharged wastewater usually contains large amounts of fat, protein, bacteria, solids and other impurities.

In the United States, the regulations regarding quantity and quality of chilled water for use in the poultry industry are promulgated by the U.S. Department of Agriculture. Many of these regulations are set forth in 9 CFR Ch. III Sec. 381.66. These regulations require certain quantities of chilled water to be used for each bird carcass (for example, one-half gallon of chilled water for each frying chicken and one gallon for each turkey). Further, the regulations impose certain quality requirements for recycled chiller water including reduction of microorganisms prior to reuse and minimum light transmission as a percentage of fresh make-up water. For various levels of quality, different quantities of recycled water must be used to replace each gallon of fresh water. For example, if microorganisms are reduced at least 98% in the recycled water and light transmission is at least 80% of that of the fresh water, then 1.10 gallons of recycled water must be used to replace each gallon of fresh water called for by the regulations.

Of all the costs involved in such a process, the most expensive step is cooling the water. Also, a large supply of fresh water may be difficult to obtain. Therefore, a method of processing water to allow the water to be recycled as cooling water in the food processing without a significant change in temperature is desirable and economical, even if somewhat more recycled water must be used as compared to fresh water.

There are a number of processes in existence for removing fats and other emulsified impurities from wastewater. Some of these processes have used some sort of air floatation (normally air bubbles injected near the bottom of the wastewater) to break emulsions in the wastewater so as to float the fat to the surface to allow removal of the fat from the water.

In other processes, the wastewater is treated with ozone to oxidize impurities in the water. For example, Sheldon in the *Journal of Food Science*, Vol. 51, No. 2, pages 305 to 309, 1986, discusses a process for disinfecting poultry chiller water using ozone. However, the Sheldon process does not provide for fat removal and the "air floatation" processes are inefficient and do not provide for disinfecting the water.

The present invention, however, provides an ozone and air treatment of wastewater in which the ozone not only oxidizes impurities (thereby killing microorganisms and generally disinfecting the water), but also aids in the fat removal process. In particular, applicant has found that a combined ozone and air mixture bubbled up through wastewater in a tower, with a suitable flow of the mixture and proper overflow design of the tower, provides for a better separation of fat from the water than does the conventional use of air bubbles alone. It is theorized that ozone alters the free surface energy relationship, of the mixture bubbles which allows or promotes adsorption of fats, oils, gases and other impurities on the surface of the ozone/air bubbles. The bubbles then carry the adsorbed material to the water surface and form a foam layer. By proper positioning of an overflow for the tower, the foam is diverted from the tower so that the fats are separated from the wastewater stream.

The present invention makes it possible to simply and efficiently simultaneously remove fat from the wastewater that would otherwise quickly block filter systems, while disinfecting the water and preparing the water for reuse in the food cooling process. The processed water constitutes a much lower refrigeration load for food processing than would be required for fresh water and the volume of makeup fresh water to the process is greatly reduced thereby reducing both fresh water and refrigeration costs.

SUMMARY OF THE INVENTION

A method and apparatus is provided for removing fat from cooling water used in food processing, while simultaneously disinfecting, oxidizing components of the water that can be oxidized with ozone and reducing the turbidity of the water. In this manner, a substantial amount of such water that has been contaminated during use may be recycled without substantially raising the temperature thereof.

The wastewater first enters a coarse filter where large debris, such as animal body parts (wings, legs, etc.), feathers, large or globulized pieces of fat, large coagulations of blood and the like is removed.

The wastewater is introduced into a tower near the top thereof so as to flow downwardly through the interior of the tower. The liquid level is preferably maintained below the top of the tower or tower overflow by level control devices or positioning of the inlet as well as sizing of the outlet to prevent the liquid from overflowing the tower. A foam layer is produced at the top of the liquid during operation. The foam layer includes gas bubbles and fats. The tower overflow is positioned such that the foam flows over the overflow while the upper level of the water is maintained below the overflow so as to separate the foam, especially the fat, from the remaining water.

The tower contains nozzles, near the bottom thereof. The nozzles are injectors of the type that break a gas stream passing therethrough into relatively small bubbles (for example, bubbles having a diameter of 5 mm. or less and preferably 2 mm. or less). The nozzles are connected to a source of ozone and air. The ozone and air gas mixture (preferably in the range of 0.01% to 4% ozone to a remainder of air in the mixture by weight) is injected into the wastewater through the nozzles and is bubbled up through the water in the tower, counter to the flow of the water. Preferably, the air/ozone mixture occupies 2% to 10% by volume of the tower with the wastewater occupying the remainder. Also preferably up to about 1.0 grams of ozone are utilized for each gallon of water treated, although the ozone use varies dramatically with water quality (especially from 0.01 to 1.0 grams of ozone per gallon of water).

In particular, the ozone in the present invention has three distinct purposes. The first purpose is to act cooperatively with the air injected into the water in the tower to enhance pickup of fat on the air bubbles rising in the tower and the formation of the foam at the top of the tower that flows over the top of the tower and thereby separates the fat from the water.

The second purpose of the ozone is to oxidize substances in the water that are oxidizable by ozone. The ozone requirement for this purpose varies greatly depending on the quality of the water and, in particular, the "load" of oxidizable substances in the water. This load varies with the volume of water used per bird, the degree of cleanliness of the bird carcasses prior to chilling, where the birds originated, etc.

The third purpose of the ozone is to disinfect the water. Disinfection normally requires a given residence time in contact with a particular disinfectant which may also be a function of temperature and water pH. Normally, for water at about 33° F., the U.S. Environmental Protection Agency currently estimates that the number of milligrams of ozone available per liter of water multiplied by the time in minutes of contact of the water with the ozone should equal 4.5 (referred to as CT value) and that this level will inactivate 99.9% of Giardia cysts and 99.999% of enteric viruses. As the cysts are much harder to inactivate as compared to bacteria, it is assumed that this level will destroy all bacteria organisms. Consequently, the ozone concentration necessary for this third purpose is dependent on residence time. Residence time can be varied by modifying the height and diameter of the tower. Where longer residence times are desired at lower concentrations, additional towers may be utilized. Increasing tower height or adding towers may be especially useful where the water is highly contaminated.

With respect to fat removal, the ozone-air gas bubbles pickup fat as the bubbles flow upward through the water in the tower and the foam resulting from this gas-fat composition is collected at the top of the tower. This foam includes fat (as used herein, the term fat includes triglycerides in general including oils and greases), protein, ozone, air and other impurities from the water. As noted above, as the ozone flows up through the tower, it also oxidizes oxidizable materials in the wastewater and, in particular, kills bacteria and other microorganisms. The foam flows over the top of the tower into a waste drain. It is important that the interface between the foam and the water be close to the top of the tower so that the foam physically flows over the top of the tower and in this way is separated from the water before the foam has a chance to break down and thus return the fat to the water. The water with the foam separated therefrom flows out of the tower near the bottom thereof. It is then passed through a residual ozone remover to remove any residual ozone, treated with chlorine (where required by plant needs) and re-used as chilled water without a substantial increase in temperature, thereby requiring very little refrigeration for reuse.

The ozone concentration in the water is preferably carefully controlled to ensure that the three purposes of the ozone are accomplished, but that excess ozone is not produced. In this manner, ozone is not wasted and substantial ozone decomposition in the off gases is not required in order to render the off gases suitable for release into the atmosphere.

The process and apparatus may be altered so that sufficient fat is removed in the tower described in the previous paragraph so that a subsequent mechanical filtration in an intermediate filter may be performed on the water without causing blockage of the intermediate filter unit due to fat build-up. This altered process shortens the residence time of the wastewater in the initial tower. Therefore, in this embodiment, the wastewater is further treated by passing the water through the intermediate filter to remove any remaining suspended solids from the water which may include dirt and blood.

The water is then introduced into a second tower or a plurality of towers in succession. The water flows from near the top to near the bottom of the second tower and each subsequent tower. Each of the second and subsequent towers is equipped with nozzles attached to a source of ozone and air. The ozone and air mixture is bubbled up through this second tower or each of the successive towers, countercurrent to the flow of the wastewater. As the wastewater travels through the second and subsequent towers, any residual fat and protein as well as odor causing compounds, turbidity causing compounds, bacteria, viruses, algae, minerals, and the like are removed from the water by the disinfecting and oxidizing action of the ozone and by the foam producing activity of the rising ozone and air mixture bubbles. After the water flows through the last of the towers, it is filtered, if necessary, to remove any solid precipitate which may have been formed in the oxidation process. The water is then passed through an ozone remover residual ozone remover to remove any residual ozone, treated with chlorine (where necessary) and returned for reuse as chilled water in food processing with minimal additional cooling.

OBJECTS OF THE INVENTION

Therefore, the objects of the present invention are: to provide an improved method and apparatus for the removal of fat, bacteria, solids and other impurities from wastewater so that the water may be re-used in food processing; to provide such a method and apparatus wherein ozone is used to enhance the removal of fat from the water by gas bubbles and further enhance the subsequent formation of a foam layer (containing a substantial portion of the fat previously in the water) above the top of the water level such that the foam layer can be removed by overflow from the water; to provide such a method and apparatus wherein the ozone also disinfects the water killing a substantial portion of bacteria and other microorganisms therein and oxidizes other impurities in the water; to provide such a method and apparatus wherein there is only a slight change in the water temperature after fat removal and disinfection; and to provide such a method and apparatus which are relatively easy to use, inexpensive to operate and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
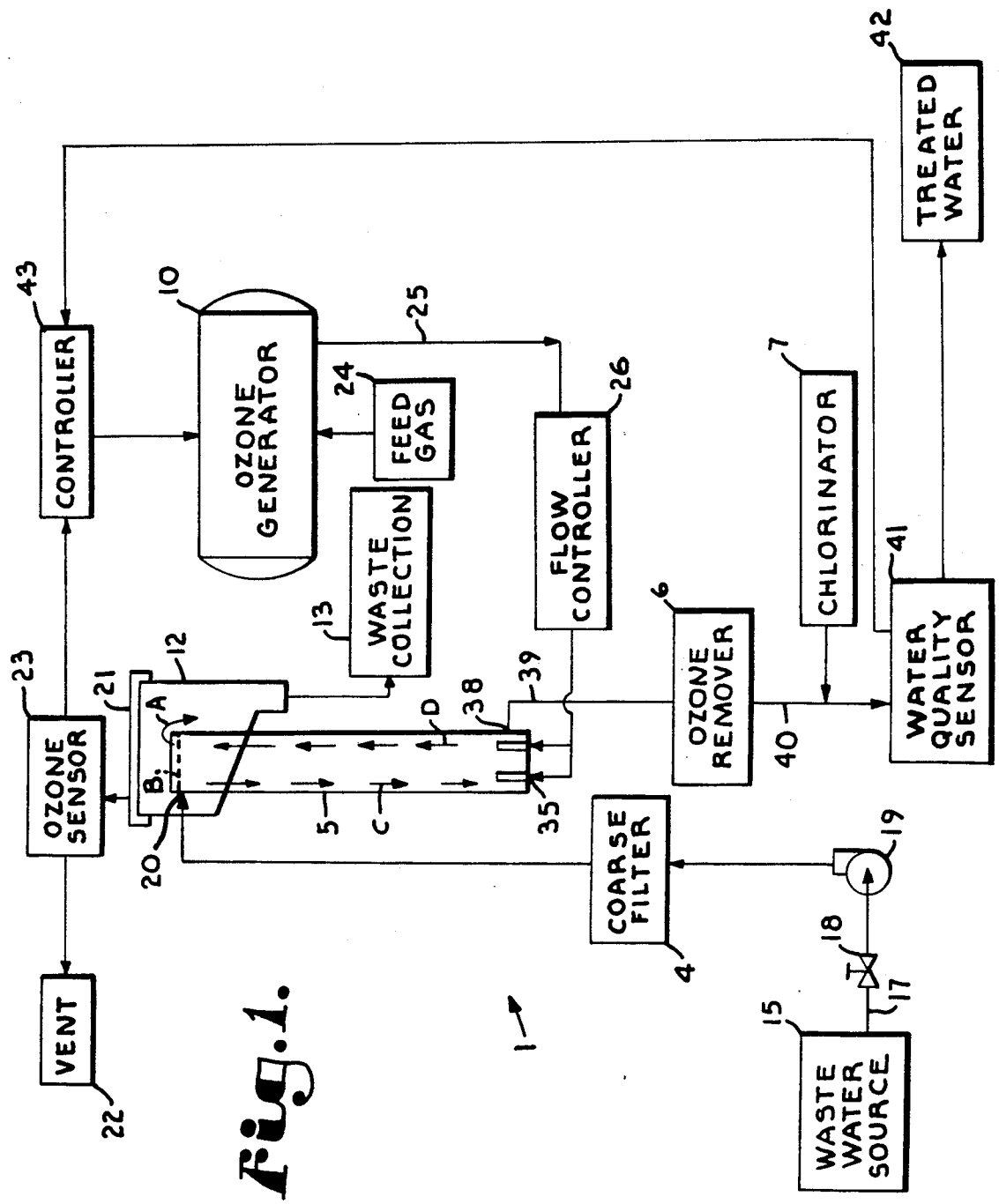
FIG. 1 is a schematic diagram of a wastewater treatment apparatus in accordance with the present invention for use in a process of treating wastewater also in accordance with the present invention, including a single tower.

An apparatus in accordance with the present invention for removal of fat and other impurities from wastewater is schematically illustrated in FIG. 1 and is generally referred to by the numeral 1.

Apparatus 1 generally comprises a coarse filter 4, a tower 5, a residual ozone remover 6, a chlorinator 7, an ozone generator 10, a waste drain 12 and a waste collector 13.

Wastewater collected from food processing (in this embodiment, chill water from a chicken carcass chilling process having chicken fat and bacteria, as well as chicken protein, blood and other contaminants therein) generally represented by the block 15 passes through a pipe 17 under flow control of a valve 18 and a pump 19 to a coarse filter 4 where several types of large debris are removed. For example, water of the present embodiment may have chicken wings and legs entrained therein that have become detached and are removed by the coarse filter 4. Feathers, dirt, large pieces of protein, fat or coagulations of blood, as well as other relatively large waste components may also be removed by the coarse filter 4. The wastewater then enters an inlet 20 near the top of the tower 5. The wastewater flows in a downflow manner through the tower; that is, from near the top to near the bottom of the tower 5.

The waste drain 12 is a shroud that surrounds the upper end of the tower 5. The drain 12 has an upper cap 21 and sidewalls that are spaced from the side of the tower 5 near the top of the tower 5 to allow foam (represented by the arrow identified by the reference letter A) to flow over the top of the tower 5 into the waste drain 12. In particular, there is a water-foam interface (represented by the reference letter B) that is maintained near the open top of the tower 5. The interface B is maintained sufficiently low to prevent the water in the tower 5 from overflowing the top of the tower 5, but is also maintained sufficiently high such that a majority of the foam A can overflow the top of the tower 5. The waste drain 12 is sealably connected to and supported by the tower 5 in spaced relation to the top of the tower 5. The foam A flows over into the waste drain 12 whereupon the foam A generally collapses releasing air and ozone and forming a liquid including a substantial portion of the fat originally entering the tower 5 with the wastewater. The waste drain 12 is slanted and converges near the bottom to direct the liquid from the foam A to the waste collection 13.

A vent 22 flow connects with the interior of the waste drain 12 to convey gas therefrom. It is foreseen that the vent 22 may route the gas therein through a system to destroy the ozone remaining. An ozone sensor 23 senses the percentage of the ozone remaining in the gas exiting through the vent 22. The vent 22 may include apparatus or chemicals to decompose any ozone passing through the vent 22 with the off gas (mostly air) from the tower in order to prevent ozone from escaping into the ambient atmosphere.

The ozone generator is a conventional ozone generator of the corona discharge type wherein air or oxygen is exposed to the corona to produce ozone. At present, most generators of this type produce about 1% to 2% ozone and the best conventional generators operating under optimal conditions generate under 4% ozone by weight. Ozone is generated in the ozone generator 10 from a feed gas represented by the block 24. Normally, the feed gas 24 comprises air or oxygen. The ozone travels through a pipe 25 under the control of flow control means represented by the flow controller 26.

The ozone and air mixture is injected into water (represented by the flow arrows C) in the tower 5 near the bottom thereof through a plurality of diffusers or nozzles 35 located at the base of the tower 5. The nozzles 35 produce numerous, small ozone and air mixture bubbles within the water in the tower 5. Preferably, the majority of the bubbles are under two millimeters in diameter.

The ozone and air mixture bubbles flow to the top of the tower 5 counter to the movement of the wastewater. Preferably, the ozone and air mixture occupies approximately 2% to 10% of the volume of the interior of the tower 5 with the wastewater occupying the remaining volume (especially in the range from 2% to 3% by volume). Solid impurities that are emulsified in the water, especially fat, are carried by the rising action of the bubbles (represented by the reference flow arrows D) to the top of the tower 5 whereat the bubbles escape from the water and form the foam A at the top of the tower 5 with the fat and other impurities entrained in the foam A.

Although it is not the intent of applicant to be bound to a particular theory as to the efficacy of the process, it is believed that the ozone alters the free energy relationship so as to allow or promote adsorption or journey of the fat and other materials to the surface of the air and ozone mixture bubbles as the bubbles D rise through the tower 5. The tower 5 is open topped and the foam flows over the top of the tower 5 into the waste drain 12 and is collected in the waste collector represented by the block 13. As the ozone and air mixture flows up the tower 5, the ozone also oxidizes oxidizable material in the wastewater and kills microorganisms therein.

The treated wastewater passes through an outlet 38 near the bottom of the tower 5 and enters a pipe 39. In the illustrated embodiment, the wastewater exits the tower due to gravity and the size of the outlet 38 and pipe 39 are such to maintain a liquid level in the tower. Preferably, the liquid level (represented by the reference line B) is maintained above or at the inlet 20 but below the top of the tower 5. It is foreseen that a liquid level sensor can be utilized to control the pump 19 to maintain an appropriate liquid level, although it is foreseen that other instruments and equipment could likewise be used to control the level. The treated wastewater passes through the residual ozone remover 6 where any residiual ozone is removed. The water enters an exit pipe 40 where chlorine from a chlorinator 7 is added to the treated wastewater that exits the apparatus 1 for return to the process utilizing the water for cooling. It is foreseen that in certain installations a chlorinator will not be required. The wastewater then passes through a quality control sensor 41 that analyzes the water for turbidity, or samples are taken and analyzed for live microorganisms or the like as required for the particular standards to be met by the water for reuse. The treated wastewater is represented by the block 42.

The water quality sensor 41 is connected to a controller 43 that operably controls the ozone production and flow output of the ozone generator 10. The controller 43 includes computerized means to compare quality paramaters such as microorganism population per volume of water entered by operators or turbidity of water from quality control sensor 41 such that, if quality limits are exceeded, then the controller 43 can adjust the output of the generator 10 to increase ozone output to the tower 5. The ozone sensor 23 is also connected to the controller 43. In this manner, the controller 43 operably reduces ozone flow to the tower 5, if ozone in the vent 22 becomes excessive and quality limits are being met at the water quality sensor 41 or, alternatively, can increase ozone flow to the tower 5 if ozone requirements are not being satisfied. It is desirable to maintain the ozone concentration in the vent 22 at or very close to zero to limit escape of ozone into the atmosphere. For certain installations, ozone decomposition equipment or chemicals may be required in the vent to prevent escape of ozone into the ambient air.

Figure 2:
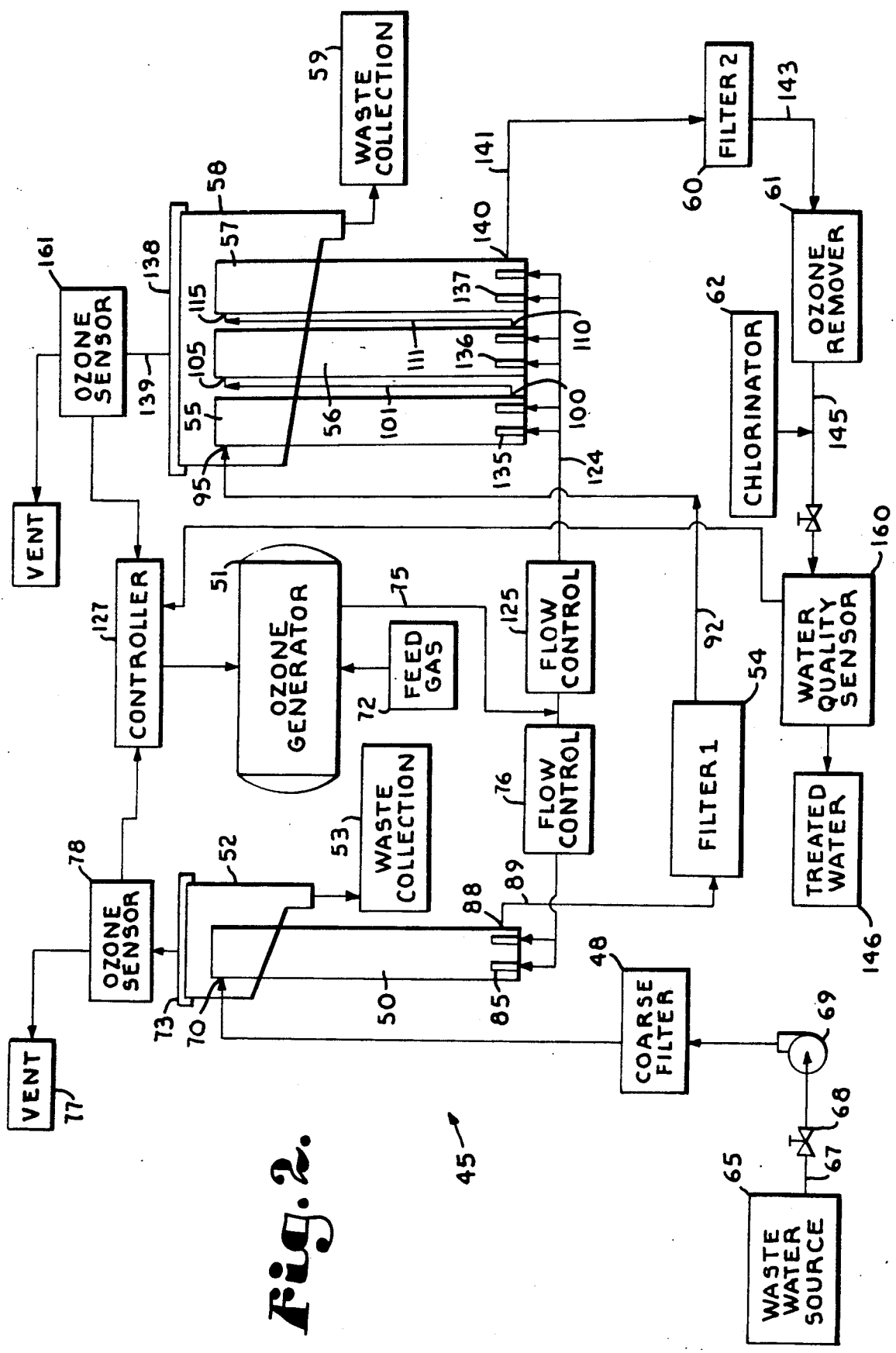
FIG. 2 is a schematic diagram of a modified wastewater treatment apparatus including multiple towers.

A modified apparatus according to the present invention is illustrated in FIG. 2 and is generally represented by the reference numeral 45. The apparatus 45 generally comprises a coarse filter 48, a first tower 50, an ozone generator 51, a waste drain 52, a waste collector 53, an intermediate filter 54, a second tower 55, a third tower 56, a fourth tower 57, a waste drain 58, a waste collector 59, a final filter 60, a residual ozone remover 61 and a chlorinator 62.

Wastewater collected from food processing and represented by the block 65 passes through a pipe 67 under the control of a valve 68 and a pump 69 to a coarse filter 48 where debris such as bird wings and legs, feathers, and large pieces of dirt are removed. The wastewater then flows to an inlet 70 near the top of the tower 50. The wastewater is directed to flow from near the top to near the bottom of the tower 50 by directing means including the configuration of the tower 50.

Ozone is produced in the ozone generator 51 from a feed gas represented by the block 72, such as air. The ozone is conveyed through a pipe 75 under control of means such as flow controller 76 to the bottom of the tower 50. The ozone generator 51 converts a percentage of the oxygen therein to ozone (normally 0.1% to 4%) and the resulting ozone and air mixture is ejected under pressure into the tower 50 near the tower bottom through a plurality of nozzles 85 located at the base of the tower 50.

The ozone and air mixture is injected into the tower 50 as a myriad of small bubbles, the majority thereof under five millimeters and preferably under 2 millimeters in diameter. The ozone and air mixture flows to the top of the tower 50 counterflow to the movement of the wastewater. Impurities, especially fat, become entrained with and/or adsorbed on the bubbles of the ozone and air mixture and rise above the liquid level interface near the top of the tower 50 so as to form a foam above the water level near the top of the tower 50.

The tower 50 extends above the water inlet 70 sufficiently to ensure only foam and not a substantial amount of the wastewater exits the tower 50 over the top.

The foam flows over the top of the tower 50 into the waste drain 52 that surrounds the top of the tower 50 in spaced relationship thereto. The foam tends to separate into a liquid and gas phase in the waste drain 52. The liquid phase, containing most of the fat that originally entered the tower 50 with the wastewater, entrained water and other impurities, is collected in the waste collector 53. The waste drain 52 includes a cap 73 having a vent 77 therethrough. The gas phase containing air and ozone exits the waste drain 52 through the vent 77. The vent 77 includes an ozone sensor 78 to determine the quantity of ozone exiting the vent 77.

The wastewater after flowing down through the tower 50 flows into and through an outlet 88 near the bottom of the tower 50 and enters a pipe 89. The wastewater then passes through an intermediate filter 54 were suspended solids, blood and other impurities susceptible to filtering action are removed. It is foreseen that in some installations the intermediate filter will not be required.

Preferably, the filter 54 is of the backflushing type and a portion of the wastewater is used to intermittently flush debris from one element of the filter to a sewer or the like while other elements remain on line to filter the wastewater passing therethrough. The wastewater then enters a pipe 92 and flows into a second tower 55 at an inlet 95 near the top thereof. The wastewater flows from near the top to near the bottom of tower 55 and exits tower 55 at an outlet 100 near the bottom thereof. The wastewater flows into a pipe 101 and enters a third tower 56 at an inlet 105 near the top thereof. The wastewater flows from near the top to near the bottom of tower 56 and exits tower 56 at an outlet 110 near the bottom thereof. The wastewater enters a pipe 111 and flows into a fourth tower 57 at an inlet 115 near the top thereof. The wastewater flows from near the top to near the bottom of tower 57. The towers 50, 55, 56 and 57 are open topped to allow flow of foam thereover.

The ozone/air mixture or ozone produced in the ozone generator 51 travels through the pipe 75 and then into pipe 124 under the control of means such as flow controller 125.

The percentage of ozone used and the mixture flow rate is generally proportional to the impurities or contaminants in the water being treated and is preferably controlled overall by a computerized controller 127 operably linked to the ozone generator 51. The ozone and air mixture is conveyed under pressure by the pipe 124 into a plurality of nozzles 135 located at the base of the tower 55, a plurality of nozzles 136 located at the base of the tower 56 and a plurality of nozzles 137 located at the base of the tower 57 so as to bubble into the water in each of the towers 55, 56 and 57. The ozone and air mixture ejected into each of the towers 55, 56 and 57 flows countercurrent to the wastewater therein to the top of each tower.

Various impurities, including protein, bacteria, algae, are urged or conveyed upward by the ozone and air mixture flowing up through each respective tower, forming a foam at the top of each tower. In this manner, the protein and other impurities including compounds causing turbidity and odors are substantially removed from the wastewater as the water flows through the successive towers. The foam flows over the top of towers 55, 56 and 57 into the waste drain 58 and is collected in the waste collector identified by the block 59. As the ozone and air mixture flows up through each of the towers 55, 56 and 57, the ozone also tends to oxidize oxidizable material in the wastewater.

The illustrated waste drain 58 collects foam from all three towers; however, it is forseen that separate drains could be provided for each tower. The waste drain 58, while spaced from the top of each tower 55, 56 and 57 is spaced therefrom sufficiently to allow the foam to overflow the towers and flow into the drain 58. The drain 58 includes a lid or top 138 covering the top thereof. A gas vent 139 is provided through the top 138 to allow air and ozone to escape from the drain 58.

The treated wastewater exits tower 57 through an outlet 140 near the bottom of tower 57 and enters a pipe 141. The water passes through the final filter 60 where solid precipitate formed in the towers 55, 56 and 57, but not carried over the top of the towers by the foam is removed. The water enters a pipe 143 and passes through the residual ozone remover 61 where residual ozone is removed. The water then enters an exit pipe 145 where chlorine may be selectively added to the water from the chlorinator 62 then exits the process as treated wastewater represented by the block 146, generally having a temperature slightly warmer than incoming wastewater (normally the temperature rise will be in the nature of 1° to 2° F. depending upon residence time, etc.) represented by the block 65 but substantially lower in temperature than ambient temperature of air or makeup water from other sources.

A water quality sensor 160 is positioned to sense certain quality paramaters of the treated water 146 such as turbidity. The sensor 160 is operably connected to the controller 127. The controller 127 is likewise connected to an ozone sensor 161 in the vent 139, the ozone sensor 78, the flow controllers 76, 125 and the ozone generator 51. In this manner, the controller 127 can compare desired quality paramaters against the quality of the treated water 146 as determined by the sensor 160 and raise the quantity of ozone to the towers 50, 55, 56 and 57 where necessary. The controller 127 can also adjust the amount of ozone to the towers 50, 55, 56 and 57 to reduce ozone flow if the sensors 78 and 161 sense too much ozone in the vent gas.

Although open top towers 5, 50, 55, 56 and 57 have been discussed herein, it is foreseen that towers having an overflow pipe at the top thereof to provide overflow means to allow the foam to overflow each tower could be also used in accordance with the invention.

The following examples are included for purpose of illustration only and are not intended to be limiting with reference with respect to the present invention.

EXAMPLE 1

Using an apparatus in accordance with the embodiment of the present invention as shown in FIG. 1 as hereinabove described, wastewater at about 33° F. from a chicken carcass cooling process that has passed through a coarse filter to remove large debris is pumped into the tower 5. The wastewater is contaminated with chicken fat, protein, bone, and blood, in addition to dirt, bacteria and other impurities. The pH of the wastewater is approximately 7.5. Suspended solids in the wastewater are approximately 400 ppm (parts per million) and settable solids approximately 120 ppm. The wastewater is reddish in color and has a milky appearance. An ozone and air mixture wherein the percentage of ozone in relationship to the air is approximately 0.25% by weight is injected into the tower 5 such that approximately 1 gram of ozone is used for each gallon of water. The water exits the tower 5 with substantially all of the fat from the chicken cooling process removed and at a temperature of 34° F. The exiting water is clear and has good light transmission.

EXAMPLE 2

Using an apparatus in accordance with the embodiment of the present invention as shown in FIG. 2 as hereinabove described, wastewater at about 35° F. from a chicken carcass cooling process, similar in composition to that described in Example 1, is pumped into the tower 50 and, subsequently, through the towers 55, 56 and 57. The wastewater is originally contaminated with chicken fat, protein, bone, blood, in addition to dirt and other impurities. An ozone and air mixture wherein the percentage of ozone in relationship to the air is approximately 1% by weight is injected into the towers 50, 55, 56 and 57. The ozone and air mixture enters the towers 50, 55, 56 and 57 at a rate such that approximately 1 gram of ozone is used for each gallon of water. The water exits the process with substantially all impurities removed and at a temperature of about 36° F. The exiting water is clear.

EXAMPLE 3

Water from a broiler processing plant wherein one gallon of chill water was used for each bird was treated in processing equipment according to the first embodiment described above. The entry temperature was less than 1° F. cooler than the exit temperature. The contaminant loading of the water was one-fifth or less than the loading of the water in Example 1. In treating the water, an average of 0.040 grams of ozone were used per gallon of water. The initial bacterial count of 17 tests varied from 19 colonies/milliliter (ml) to 236,000 colonies/ml and the ozone used reduced the bacterial count in the treated water to zero in all tests. (The ozone required to reduce the bacterial count by 98% was calculated to be 0.022 grams/gallon of water).

It is to be understood that while certain forms of the present invention have been illustrated and described herein, it is not to be limited to the specific forms or arrangement of parts described and shown.

What is claimed and desired to be secured by Letters Patent is as follows:

1. A process for removing fat and other impurities from water, said process comprising the steps of:
   (a) introducing wastewater that has previously been used for chilling in a carcass cooling process including water and other impurities and having a substantial quantity of fat therein into a tower having a top and a bottom, the wastewater introduced through an inlet near said tower top;
   (b) flowing at least the water portion of the wastewater from near said tower top to near said bottom;
   (c) injecting an ozone and air mixture into the wastewater in said tower near said bottom;

(d) flowing said ozone and air mixture upwardly through the wastewater, counter to movement of the wastewater through said tower, thereby forming a foam of said fat and said impurities including substantially all of said fat entering said tower with said wastewater; said foam rising to the top of said tower;

(e) withdrawing the water from said tower at an outlet near said tower bottom; and (f) allowing said foam with substantially all of said fat to overflow said top of said tower into a waste drain, wherein said waste drain comprises a shroud surrounding the upper end of said tower.

2. The process of claim 1 including the steps of:

(a) flowing the wastewater through a coarse filter prior to the step of introducing the wastewater into said tower, said coarse filter removing large debris from the wastewater; and (b) subsequent to passing through the tower, passing the water through a residual ozone remover so as to remove residual ozone from the water.

3. The process of claim 1 including the step of:

(a) adjusting the percentage of ozone in relationship to water within said tower to provide sufficient contact between said ozone and said water to substantially disinfect said water.

4. The process of claim 3 including the step of:

(a) during operation of said process adjusting the percentage of ozone and air mixture in relationship to the residence time of the wastewater in said tower by controlling the flow rate of the ozone and air mixture into said tower to sufficiently remove fat from said water and disinfect said wastewater.

5. The process of claim 1 including the step of:

(a) adjusting the percentage of ozone in relationship to the air within said ozone and air mixture to be within approximately a range of one-tenth of one percent (0.1%) to four percent (4%) by weight.

6. The process of claim 5 including the step of:

(a) adding between 0.01 and 1 gram of ozone to the water in said tower for each gallon of water.

7. A process for removing impurities including a substantial amount of fat, microorganisms, and other solids from wastewater having water therein that had been used in cooling food products being processed containing such fat in a food processing environment so that a substantial portion of the water may be returned to the food processing area for reuse, said process comprising the steps of:

(a) introducing the wastewater with said fat therein into a first tower having a top and a bottom, the wastewater being introduced through an inlet near said first tower top;

(b) flowing the wastewater from near said top of said first tower to near said bottom;

(c) injecting a first ozone and air mixture into the wastewater in said first tower near said bottom;

(d) flowing said first ozone and air mixture upwardly through the wastewater, counter to movement of the wastewater through said first tower, thereby forming a first foam near said top of said first tower, said first foam including substantially all of said fat in said wastewater and said ozone and air mixture;

(e) flowing said first foam with said fat therein over said tower into first waste drain means comprising a first shroud surrounding the upper end of said first tower;

(f) subsequently introducing the wasterwater stream less the portion thereof removed in said first tower into a second tower having a top and a bottom with the wastewater being introduced through an inlet near said second tower top;

(g) flowing the wastewater in the second tower from near said top of said second tower to near said bottom thereof;

(h) injecting a second ozone and air mixture into the wastewater in said second tower near said bottom thereof;

(i) flowing said second ozone and air mixture upwardly through the wastewater in said second tower, counter to movement of the wastewater through said second tower, thereby forming a second foam near said top of said second tower, said second foam including impurities from the wastewater; and (j) flowing said second foam over said top of said second tower into second waste drain means comprising a second shroud surrounding the upper end of said second tower.

8. The process of claim 7 including the steps of:

(a) flowing the wastewater through a coarse first filter prior to the step of introducing the wastewater into said first tower, said coarse filter removing large debris from the wastewater;

(b) subsequent to said wastewater exiting said first tower and prior to entering said second tower, passing said wastewater through a fine second filter;

(c) subsequent to said wastewater exiting said second tower, passing the waste through a third filter; and (d) passing the wastewater through an ozone remover, said ozone remover removing residual ozone from the wastewater.

9. The process of claim 7 including the step of:

(a) adjusting the amount of said ozone and air mixture introduced into said first tower in relationship to the water to remove substantially all fat from the water in said first foam overflowing said first tower.

10. The process of claim 7 including the step of:

(a) adjusting the percentage of ozone in relationship to the water in said first and second towers to substantially kill microorganisms in the water during passage through the towers.

11. The process of claim 7 including the step of:

(a) adjusting the percentage of said ozone and air mixture relative to the water introduced into said second tower to substantially remove any remaining impurities from the water, to oxidize oxidizable materials in the water and to kill microorganisms remaining in the water.

12. The process of claim 11 including the step of:

(a) adjusting the percentage of ozone in relationship to the water in said second tower to substantially kill all remaining microorganisms in the water.

13. The process of claim 7 including the step of:

(a) adjusting the percentage of ozone in relationship to the air within said ozone and air mixture to be within approximately a range of one-tenth of one percent (0.1%) to four percent (4%) by weight of the mixture.

14. The process of claim 7 including the step of:

(a) adjusting the ozone added to said first tower such that between 0.01 and 1 gram of ozone is added to the water in said first tower for each gallon of water.

15. A process for removing impurities including fat, microorganisms, and other solids from wastewater subsequent to use of water in the wastewater for chilling food products being processed in a food processing environment so that a substantial portion of the wastewater may be returned to the food processing area for reuse, said process comprising the steps of:
 (a) introducing the wastewater with the fat therein into a first tower having a top and a bottom with the wastewater being introduced through an inlet near said first tower top;
 (b) flowing the wastewater from near said top of said first tower to near said bottom thereof;
 (c) injecting a first ozone and air mixture into the wastewater in said first tower near said bottom thereof;
 (d) flowing said first ozone and air mixture upwardly through the wastewater, counter to movement of the wastewater through said first tower, thereby forming a first foam near said top of said first tower, said first foam including a substantial portion of the fat and said ozone and air mixture;
 (e) flowing said first foam with substantially all of said fat therein over the top of said tower into first waste drain means comprising a first shroud surrounding the upper end of said first tower;
 (f) flowing said wastewater from said first tower;
 (g) introducing the wastewater subsequent to said first tower into an initial tower of a multi-tower unit, said multi-tower unit having a plurality of successive towers, each tower in said unit having a top and a bottom, the wastewater being introduced through an inlet near said top of said initial tower;
 (h) flowing the wastewater from near said top of said initial tower to near said bottom thereof;
 (i) flowing the wastewater from said initial tower at an outlet near the bottom of said initial tower;
 (j) subsequently introducing the wastewater into a successive tower of said multi-tower unit through an inlet near the top of said successive tower;
 (k) flowing the wastewater from near the top of said successive tower to near the bottom thereof;
 (l) flowing the wastewater from said successive tower from an outlet near the bottom of said successive tower;
 (m) passing the wastewater through each of said towers of said multi-tower unit in the same manner as described in steps (j) through (l);
 (n) injecting a second ozone and air mixture into the wastewater in each of said towers of said multi-tower unit near the bottom of each of said towers, said second ozone and air mixture flowing upwardly through the wastewater, counter to the movement of the wastewater, thereby oxidizing oxidizable material within the wastewater and forming a second foam near the top of each of said towers, said second foam including impurities and said ozone and air mixture; and
 (o) flowing said second foam over the top of each of said towers of said multi-tower unit into second waste drain means comprising a second shroud surrounding the upper end of said multi-tower unit.

16. The process of claim 15 including the steps of:
 (a) flowing the wastewater through a coarse first filter prior to the step of introducing the wastewater into said first tower, said coarse filter removing large debris from the wastewater;
 (b) subsequent to said first tower and prior to said initial tower of said multi-tower unit, flowing the wastewater through a second filter; said second filter being a fine filter relative to said first filter to remove solid debris from said wastewater;
 (c) subsequent to said wastewater exiting said multi-tower unit, passing the wastewater through a third filter; and
 (d) subsequently passing the wastewater through an ozone remover, said ozone remover removing residual ozone from the water.

17. The process of claim 15 including the step of:
 (a) adjusting the percentage of ozone and air mixture in relationship to the water introduced into said first tower to remove a substantial amount of the fat from the water.

18. The process of claim 17 including the step of:
 (a) adjusting the percentage of ozone in relationship to the water in all of said towers to substantially kill all microorganisms in the water during passage through said towers.

19. The process of claim 15 including the step of:
 (a) adjusting the percentage of the ozone and air mixture in relationship to the water introduced into each of said towers of said multi-tower unit to remove substantially any floatable impurities remaining in the water subsequent to said first tower.

20. The process of claim 15 including the step of:
 (a) during operation of said process adjusting the percentage of ozone in relationship to the wastewater in each of said towers to provide sufficient ozone relative to each gallon of water to satisfy a preselected disinfecting of the water related to quantity of ozone per gallon and residence time of the wastewater adjusted by controlling the flow rate of the ozone and air mixture into said first tower in contact with the ozone.

21. The process of claim 15 including the step of:
 (a) adjusting the percentage of ozone in relationship to the air within said first and second ozone and air mixtures to be within approximately a range of one-tenth of one percent (0.1%) to four percent (4%) by weight.

22. The process of claim 15 including the step of:
 (a) adding between 0.01 and 1 gram of ozone to the water in said first tower for each gallon of water.

23. An apparatus for removing impurities including fat from wastewater used for chilling food products being processed in a food processing environment, said apparatus comprising:
 (a) a first tower for receiving the wastewater with the fat therein, said first tower having an upper portion and a lower portion;
 (b) said first tower upper portion having a top and an inlet near said top thereof for introducing the wastewater into said first tower;
 (c) said first tower top adapted to connect to a first waste drain by overflow means comprising a first shroud surrounding the upper end of said first tower;
 (d) said lower portion of said first tower having a bottom and an outlet near said bottom for removing the wastewater from said first tower;
 (e) said bottom of said first tower communicating with a source of an ozone and air mixture;

(f) said first tower having a flow directing means such that the wastewater flows generally downward and said ozone and air mixture flows generally upward, counter to movement of the wastewater so that said ozone and air mixture mixes with the water and forms a foam that floats to the top of said first tower so as to generally remove fat from the wastewater; said flow direction means operably maintaining the upper level of the water in said first tower below but in close proximity to said overflow means such that the foam overflows the first tower into said first waste drain;

(g) intermediate first filtration means operably flow located subsequent to said first tower;

(h) subsequent to said first filtration means, a second tower flow connected and subsequent to said first tower; said second tower having an upper portion and a lower portion;

(i) said upper portion of said second tower having a top and an inlet near said top for introducing wastewater into said second tower; said inlet flow connected to said first tower;

(j) said top of said second tower adapted to connect to a second waste drain by overflow means comprising a second shroud surrounding the upper end of said second tower;

(k) said lower portion of said second tower having a bottom and an outlet near said bottom for removing water from said second tower;

(l) said bottom of said second tower communicating with a source of an ozone and air mixture;

(m) said second tower having a flow directing means such that the wastewater flows generally downward and said ozone and air mixture flows generally upward, counter to movement of the wastewater so that said ozone and air mixture mixes with the wastewater and forms a foam that floats to the top of the second tower and overflows into said overflow means so as to remove a substantial portion of remaining impurities from the wastewater.

24. The apparatus according to claim 23 including:
(a) second filtration means connected to receive the water subsequent to said outlet of said second tower; and
(b) a residual ozone remover flow connected to receive said water subsequent to said second tower.

25. An apparatus for removing impurities including fat from wastewater for chilling food products being processed used in a food processing environment, said apparatus comprising:
(a) a coarse filter, said coarse filter connected to a source of the wastewater;
(b) a first tower flow connected to said coarse filter, said first tower having an upper portion and a lower portion;
(c) said first tower upper portion having a top and an inlet near said top thereof for introducing the wastewater with the fat therein into said first tower;
(d) said first tower top having overflow means connected to first waste drain means comprising a first shroud surrounding the upper end of said first tower;
(e) said lower portion of said first tower having a bottom and an outlet near said bottom for removing the wastewater from said first tower;

(f) the bottom portion of said first tower having a gas dispersion nozzle connected to a source of an ozone and air mixture;
(g) intermediate first filtration means operably flow located subsequent to said first tower;
(h) subsequent to said filtration means, a multi-tower unit having a plurality of successive towers, each of said towers having an upper portion and a lower portion;
(i) said multi-tower unit including an initial tower and a final tower;
(j) said upper portion of each of said towers in said multi-tower unit having a top and an inlet near said top for introducing wastewater into each of said towers; said inlet of said initial tower being flow connected to said intermediate filtration means;
(k) said top of each of said towers in said multi-tower unit each including overflow means connected to second waste drain means comprising a second shroud surrounding said multi-tower unit;
(l) said lower portion of each of said towers in said multi-tower unit having a bottom and an outlet near said bottom for removing the wastewater from each of said towers;
(m) said outlet of each of said towers in said multi-tower unit connecting to said inlet of each successive tower in said multi-tower unit;
(n) the bottom portion of each of said towers in said multi-tower unit having a gas dispersion nozzle connected to a source of an ozone and air mixture; and
(o) each of said towers in said multi-tower unit having a flow directing means, said flow directing means directing the wastewater to flow substantially downward and said ozone and air mixture to flow substantially upward, counter to movement of and in mixing relationship with the wastewater so that said ozone and air mixture forms a foam with the impurities in the wastewater that rises to the top of a respective tower and overflows into the overflow means so as to remove a substantial amount of the impurities from the wastewater.

26. The apparatus according to claim 25 including:
(a) final filtration means flow connected to the outlet of said final tower; and
(b) a residual ozone remover flow connected to the outlet of said final tower.

27. In a process for treating cooled wastewater containing substantial amounts of fat wherein the wastewater has been used in food processing for chilling animal carcasses with a countercurrent flow of an air and ozone mixture; the improvement comprising:
(a) flowing the wastewater with substantially all of the fat therewith into a tower wherein the wastewater is subjected to the countercurrent flow of air and ozone mixture;
(b) forming a foam at the top of the tower containing substantially all of said fat and thereafter overflowing said foam from remaining wastewater into waste drain means comprising a shroud surrounding the upper end of said tower so as to thereby separate the fat from the remaining wastewater; and thereafter;
(c) flowing the remaining wastewater substantially free of fats from said tower.

28. The process according to claim 27 wherein:
(a) said water exits said process at a temperature only slightly raised above the temperature of the water just prior to entering the process.

* * * * *